April 11, 1961 H. L. POTTER 2,979,345
BEARING SEAL
Filed April 30, 1957 2 Sheets-Sheet 1
FIG. 1.
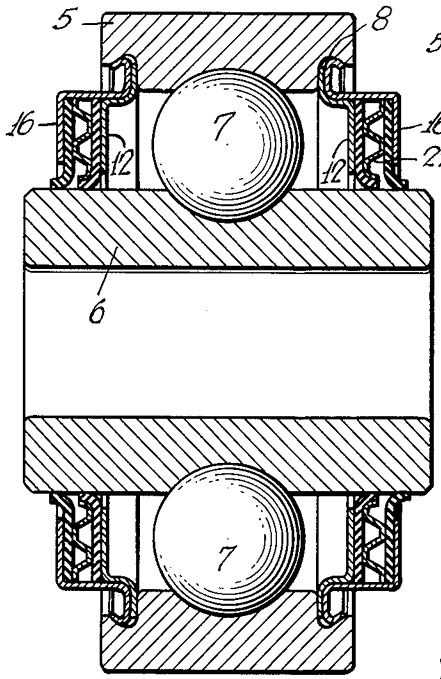
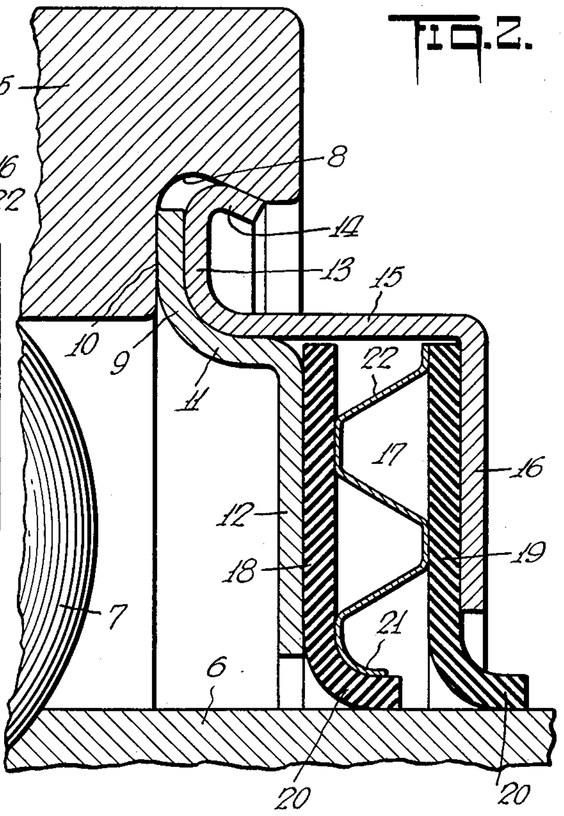
FIG. 2.
FIG. 3.
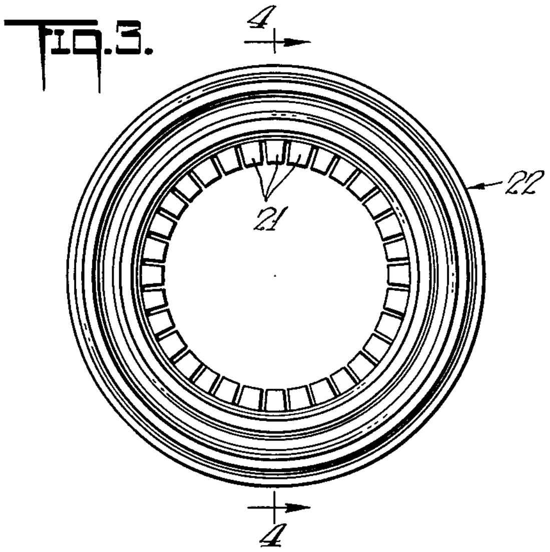
FIG. 4.
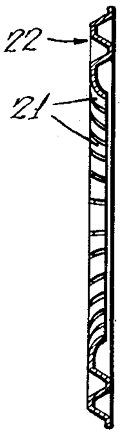
INVENTOR
Howell L. Potter
BY
Mitchell & Bechert
ATTORNEYS April 11, 1961 H. L. POTTER 2,979,345

BEARING SEAL

Filed April 30, 1957 2 Sheets-Sheet 2

INVENTOR
Howell L. Potter
BY
Mitchell & Bechert
ATTORNEYS

United States Patent Office 2,979,345
Patented Apr. 11, 1961

1

2,979,345
BEARING SEAL

Howell L. Potter, New Britain, Conn., assignor to The Fafnir Bearing Company, New Britain, Conn., a corporation of Connecticut Filed Apr. 30, 1957, Ser. No. 656,136
3 Claims. (Cl. 286—5)

My invention relates to a bearing seal and more particularly to a seal for an antifriction bearing.

It is an object of the invention broadly to provide an improved bearing seal.

Another object is to provide a bearing seal, which will be highly effective in retaining lubricant in the bearing and preventing the ingress of foreign matter from the outside of the bearing.

Another object is to provide a very secure bearing seal, which consists of few parts, all easy to manufacture and apply.

Other objects and various features of novelty and invention will be hereinafter pointed out or will become apparent to those skilled in the art.

The bearing seal is particularly adapted for application to bearings which are put in locations where there may be considerable external contamination, such as dirty oil or other liquids or fluids. The seal will serve adequately to hold back any foreign matter exterior of the bearing and will retain grease or other lubricant in the bearing itself.

In the preferred form, the bearing consists of plate means or plates secured to one bearing ring and extending in spaced relation toward the other bearing ring and providing an annular chamber facing such other bearing ring. In the annular chamber, one or more seal members may be placed, and these seal members may be reinforced and also urged by external resilient means toward the ring to be sealed. The seals consist of resilient material, preferably in the form of a rubber washer or washers, which in the preferred form may be backed up by a presser member for holding the seal washer in place and providing additional spring pressure for urging the seal washer into contact with its ring to be sealed.

In the drawings which show, for illustrative purposes only, preferred forms of the invention—

Fig. 1 is a diametral longitudinal sectional view, through a bearing, embodying seals illustrative of the invention;

Fig. 2 is an enlarged fragmentary sectional view of the bearing shown in Fig. 1 and illustrating one of the seals;

Fig. 3 is a an axial view in elevation of a presser member shown in Figs. 1 and 2;

Fig. 4 is a sectional view of the presser member, taken substantially in the plane of the line 4—4 of Fg. 3;

Figure 5:
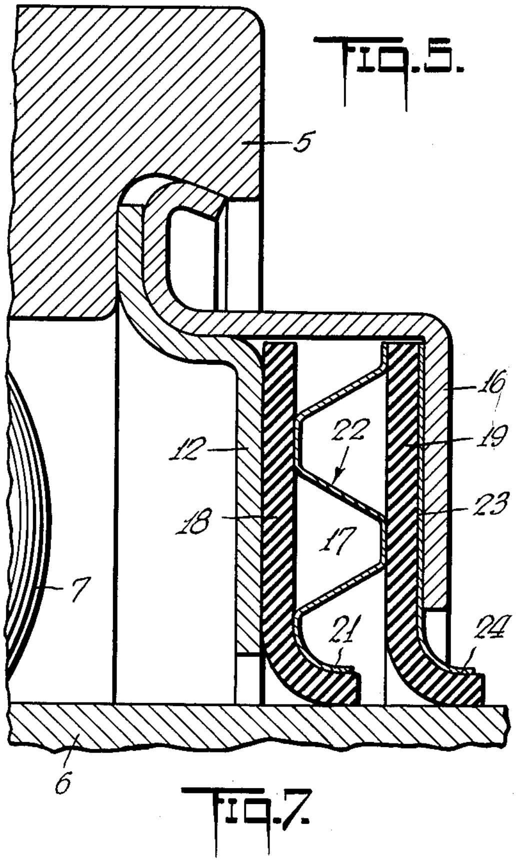
Fig. 5 is a view similar to Fig. 2, but illustrating a slight modification.

The bearing to which the seal is applied may consist of an antifriction bearing having an outer ring 5, an inner ring 6, with interposed antifriction bearing members such

2 as balls 7. One of the rings (in this case the outer ring) has an undercut groove 8 adjacent one edge thereof for holding plate means forming part of the seal. In the preferred form, the plate means comprising two plates are secured in the groove 8 and extend toward the other ring (in this case the inner ring) and provide an annular chamber facing such inner ring. The plate means as illustrated may consist of a metal washer 9 fitting tightly against an anvil or shoulder 10 on the outer ring and extending downwardly and outwardly as shown at 11, and then radially as shown at 12, down toward the other ring, namely, the inner ring in this case. Other plate means (in this case a washer-like member 13) fits tightly against the washer 9 and has its outer edge crimped, rolled or stacked, as indicated at 14, in the groove 8 of the outer ring. This washer 13 has an axially extending cylindrical portion 15 and a radially extending flat portion 16 so as to form with the plate part 12 an annular chamber 17 facing the inner ring and spaced therefrom.

In the form shown in Figs. 1 to 4, there are two seal washers 18—19 in the chamber 17, and these washers are of resilient material, preferably of material referred to as rubber, which may consist of washers formed of rubber or the like backed up by fabric or some similar construction. These washers preferably fit the chamber 17 radially and are bent or distorted at the periphery (in this case the inner periphery), as indicated at 20, so as to fit with a flat side or cylindrical portion about the inner ring, so as to form a relatively extensive seat area and a tight seal. These washers may be preformed to some extent to provide the distortions 20, or the washers may be stretched over the inner ring 6 to provide the tight sealing effect.

Now, in order to make sure that the washers seal properly against the inner ring, I provide resilient means, such as spring fingers 21, engaging the cylindrical portion 20 of the washer 18 so as to constantly urge the latter into tighter contact with the outer surface of the inner ring 6. In the form illustrated, these spring fingers 21 are formed on the inner periphery of a presser member 22, which is preferably of spring material and may be of thin spring metal formed into truss shape, as illustrated in the figures, and terminating in the fingers 21, as illustrated. The truss shaped spacer member or presser preferably presses against the inner sides of the two washers 18—19 so as to hold the same in contact with their respective plates 12—16 so that no oil or other material will leak between the washers and the plates. The outer washer 19 in the form shown in Figs. 1 to 4 does not have spring fingers 21 in contact therewith, and the resiliency of the washer itself is relied upon to maintain the washer in sealing contact with the inner ring.

The inner washer 18 will have a very firm sealing engagement with the outer cylindrical surface of the inner ring, due to its own resiliency and the spring fingers 21. The outer washer 19 may have a slightly less firm contact with the inner ring, but such contact will normally be sufficient to hold oil or the like from flowing between itself and the inner ring in either direction. In any event, the inner seal washer 18 will form a very tight seal, while the outer washer 19 will provide a guard seal for the inner seal so as to prevent contaminating particles from reaching the inner seal at all. Thus, such a seal could be placed on a bearing which is subjected to dirty oil or other material which might contaminate a ball bearing, and such contaminating material will be definitely excluded by the double seal arrangement shown in the drawings. If both sides of the bearing are subjected to contaminating influences, then there may be seals on both sides, as shown in Fig. 1.

In the form shown in Fig. 5, all of the parts are the same as heretofore described and have been given the same reference characters, except that the outer seal washer 19, instead of abutting flat against the plate 16, has a flat disc presser member 23 interposed between that washer and the plate 16. This presser member, or washer 23, is preferably a flat washer of resilient material, which may be thin sheet metal, and is practically coextensive with the seal washer 19 and at the inner periphery the presser washer 23 is provided with spring fingers 24, which fit the curved part in the cylindrical part of the seal washer 19, as heretofore described in connection with the presser having the fingers 21 engaging its seal washer 18. The seal shown in Fig. 5 may be used for the same purpose as that illustrated in Figs. 1 to 4, but may provide a more secure seal and one fitted for use under very severe operating conditions.

Figure 6:
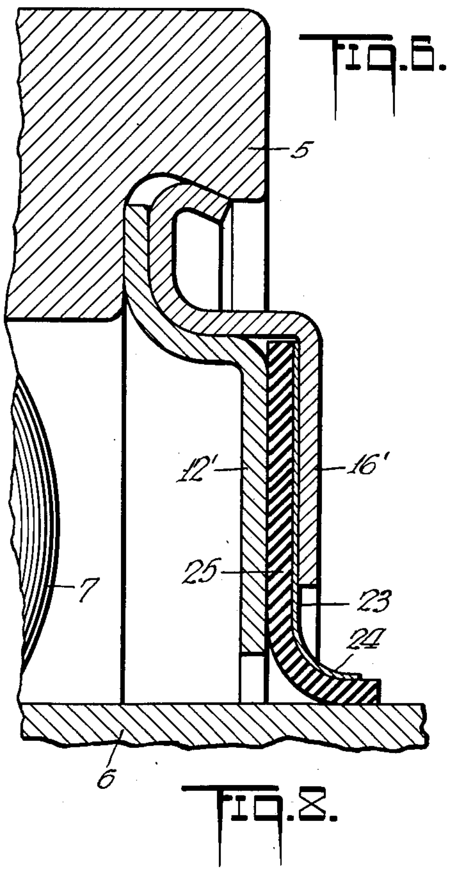
Fig. 6 is a view similar to Fig. 2, but illustrating a further modification.
Figure 7:
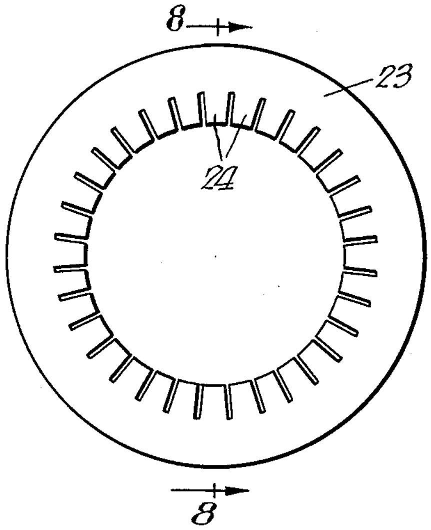
Fig. 7 is an axial view in elevation of a presser member shown in Figs. 5 and 6.
Figure 8:
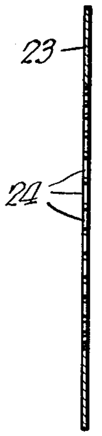
Fig. 8 is a sectional view, taken substantially in the plane of the line 8—8 of Fig. 7.

In the form shown in Fig. 6, the plates 12'—16' correspond exactly with the plates 12—16 heretofore described, except that they are nearer to each other and, in fact, just about far enough apart to form a chamber to receive the seal washer 25 and a presser member 23, heretofore described. This presser member has its fingers 24 engaging the cylindrical or sealing portion of the washer 25, so as to provide a very secure seal. This seal of Fig. 6 will normally be as secure as the inner seals shown in Figs. 2 and 5, but, as illustrated, will not have an outer protecting or guard seal to shield this main seal from contact with foreign matter.

It will be seen that I have provided improved seals, which are simple in construction and easy to apply, and which will be highly satisfactory as seals in locations where the sealing conditions are severe and the seals are normally subjected to exterior contaminants.

While the invention has been described in considerable detail and preferred forms illustrated, it is to be understood that various changes may be made within the scope of the invention as defined in the appended claims.

I claim:

1. In a seal for a bearing having inner and outer bearing rings with interposed anti-friction bearing members, said seal comprising a pair of plates secured to the outer of said rings and having spaced apart peripheral surfaces forming an open U-shaped annular chamber opening to the adjacent cylindrical surface of the inner of said rings, a seal washer of resilient material in said chamber and having a peripheral portion deformed into seating engagement with the cylindrical surface of said inner of said rings, and a presser member having portions extending across said chamber to press said washer against one of said plates and having resilient spring fingers engaging said peripheral portion of said washer and urging said peripheral portion into resilient sealing seating engagement with the cylindrical surface of said inner of said rings independently of the inherent resiliency of said peripheral portion.

2. In a bearing seal for an anti-friction bearing having inner and outer rings with interposed anti-friction bearing members, said seal comprising, a pair of plates carried by the outer ring and having spaced apart surfaces forming an annular chamber facing the outer cylindrical surface of the inner ring, a resilient seal washer in said annular chamber and having its inner periphery in sealing seating engagement with the outer cylindrical surface of said inner ring, and an annular presser member having an irregular cross section with portions extending between said spaced apart surfaces to urge said seal washer against one of said surfaces and to stiffen the seal washer and having spring fingers at the inner periphery and engaging said inner periphery of said seal washer to press the latter into sealing seating engagement with said outer cylindrical surface of said inner ring, independently of the inherent resiliency of said inner periphery of said sealing washer.

3. In the combination defined in claim 2, and a second seal washer in said annular chamber and having the inner periphery in sealing engagement with the cylindrical outer surface of said inner ring, said two seal washers being spaced apart, one being adjacent one plate and the other being adjacent the other plate.

References Cited in the file of this patent

UNITED STATES PATENTS

| | | |
|---|---|---|
| 2,276,225 | Carter | Mar. 10, 1942 |
| 2,426,174 | Bottomley | Aug. 26, 1947 |
| 2,587,405 | Stevens et al. | Feb. 26, 1952 |
| 2,755,113 | Baumheckel | July 17, 1956 |
| 2,764,433 | Cobb | Sept. 25, 1956 |

FOREIGN PATENTS

| | | |
|---|---|---|
| 465,991 | Italy | Oct. 8, 1951 |
| 514,842 | Canada | July 19, 1955 |
| 978,288 | France | Nov. 22, 1950 |